May 19, 1931. C. STEDEFELD 1,805,928
RUNNING GEAR FOR HIGH SPEED SUSPENSION CARS
Filed Sept. 19, 1927
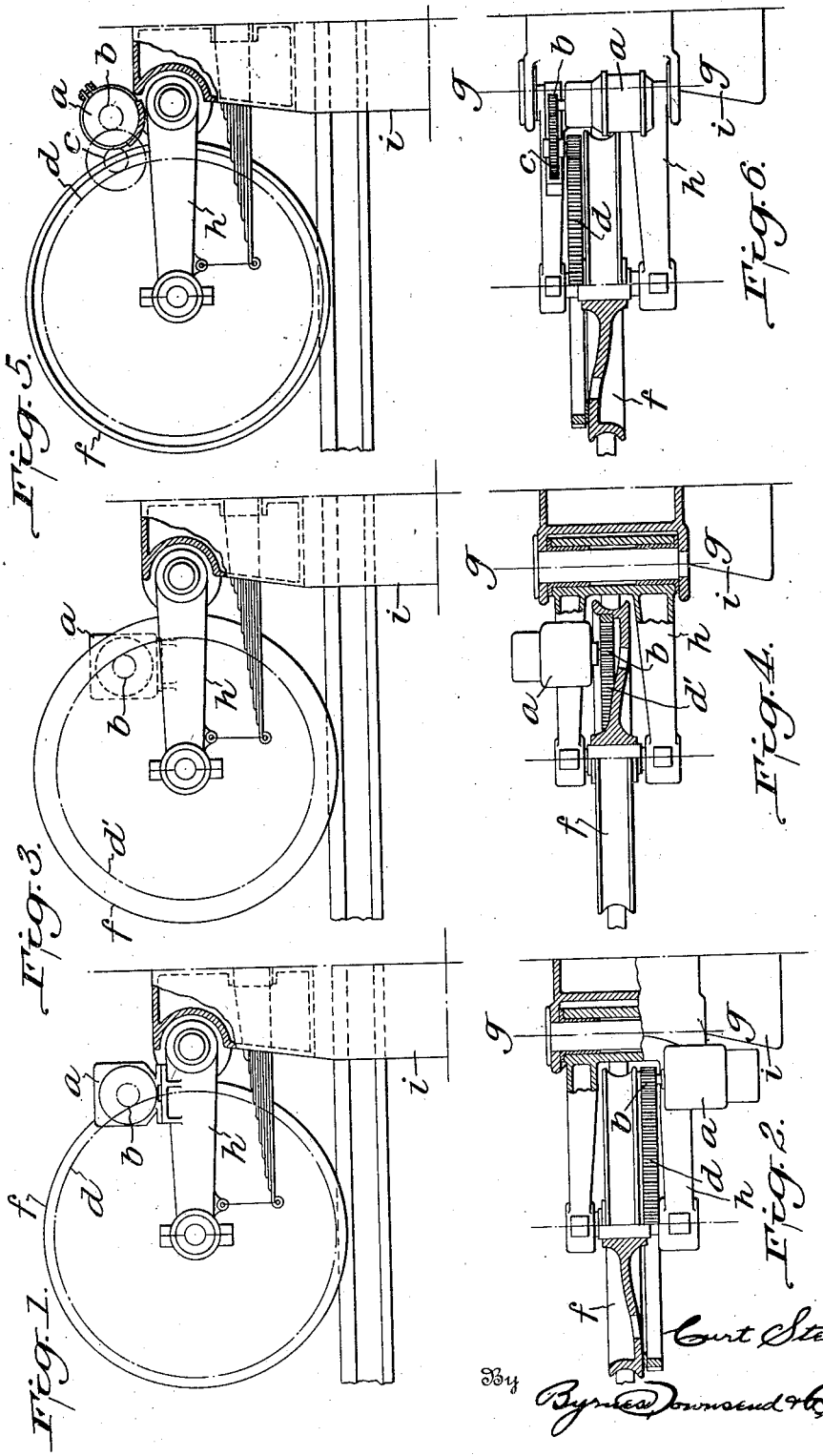

Patented May 19, 1931

1,805,928

UNITED STATES PATENT OFFICE

CURT STEDEFELD, OF HEIDELBERG, GERMANY

RUNNING GEAR FOR HIGH-SPEED SUSPENSION CARS

Application filed September 19, 1927, Serial No. 220,535, and in Germany March 24, 1926.

This invention relates to running gear for high speed suspended railway vehicles in which the individual running wheels are borne at the ends of oscillating arms. If such vehicles are to be driven through the running wheels the unsprung weight of the running wheels and the turning arms, that is, that part of the weight which is not supported by the springs, must not be increased at all, or at most by a very slight amount by the driving motor or the drive transmitting gear. Wheel hub electric motors as in electric automobiles, or flange motors on the ends of the running wheel axles as usual in gantries would raise the unsprung weight of the running wheels just as much as the usual bearer arm carried motors in tramways, in which indeed only a part of the motor weight acts to increase the unsprung weight.

The present invention solves the problem of providing a motor drive to the wheels of high speed suspended railway vehicles, which does not increase, or only imperceptibly increases the unsprung weight of the wheels and the forked arms thereof, the motor at the same time being in all cases easily accessible, and which is contained exclusively within the existing constructional members necessitated by the existing vehicle profile, thus causing no additional air resistance. In considering this problem, two cases must be distinguished, firstly the driving of the running wheels by small auxiliary motors which can only develop a low auxiliary power as is necessary for example for low speeds (in shunting the vehicles and so forth); and secondly driving by powerful motors for fast long runs, which are arranged on the arm in relation to which the wheel is sprung or in the vehicle body. In the first case the weight of the driving motor is very small and it can therefore according to the invention be simply borne on the turning arm as closely as possible to the turning axis so that the unsprung weight is only raised by an inconsiderable amount, while the motor remains freely accessible. In the second case the large driving motors appertain entirely to the sprung weight being borne in a freely accessible and changeable manner on the carrier arm of the running wheel gear or in the vehicle body and connected with the running wheels by suitable transmitting gear.

The invention will be more particularly described with reference to the accompanying drawings, of which:

Fig. 1 is a side elevation and Fig. 2 is a plan in partial section of a running wheel with a motor attached to the turning arm;

Fig. 3 is a side elevation and Fig. 4 is a plan in partial section of another embodiment;

Fig. 5 is a side elevation and Fig. 6 a plan in partial section of a third embodiment.

In the embodiments illustrated in Figures 1 to 6 the small driving motor $a$ is simply mounted directly on the carrier arm $h$. According to the arrangement of the toothed gearing by which the drive is transmitted to the wheels $f$ the motor $a$ is carried nearer to or further from the axis $g$, $g$, of the pivot borne in the carrier arm $i$ of the vehicle body.

In the arrangement shown in side view in Figure 1 and partly in plan, partly in horizontal section in Figure 2, the shaft of the motor $a$ carries a pinion $b$ meshing directly with an externally toothed ring $d$ on the running wheel $f$. Instead, as shown in side view in Figure 3 and partly in plan view, partly in horizontal section in Figure 4, the pinion $b$ can mesh with an internally toothed annulus $d$ on the inside of the rim of the running wheel $f$. Or, as shown in side view in Figure 5 and partly in plan, partly in section in Figure 6, a countershaft gear $c$ can be interposed between the pinion $b$ and the externally toothed ring $d$.

The inertia effect of the motor $a$ during oscillations when the vehicle is running becomes less as its position approaches the turning axis $g$—$g$ of the arm $h$ and varies with the square of this distance. In the form shown in Figures 5 and 6 for example the motor axis is only one third as far from the axis $g$—$g$ as the centre of the running wheel $f$. If the running wheel $f$ weighs for example 200 kg. and the motor $a$ 50 kg. its inertia effect during shocks between the wheel and rail is only $(1/3)^2 . 50 : 200 = 1/36$ that of the running wheel, and is therefore negligible. Even with the arrangement (Figures 3 and 4) where the motor $a$ is about half as far from the axis $g$—$g$ as the wheel $f$ its inertia effect is still only $(\frac{1}{2})^2 . 50 : 200 =$ 1/16 that of the wheel, whereas a flange motor of equal weight on the running wheel axis would increase the effect by $1^2 . 50 : 200 =$ 1/4 of the weight of the wheel. It will also be seen that the motor fits into the profile of the vehicle formed by the running gear and the carrier arm $i$ and that it is freely accessible and can easily be changed.

I claim:

1. Running gear for high-speed spring-mounted suspension cars comprising, in combination with the running wheels horizontal forked arms hinged to the car body, each of said forked arms carrying one of said wheels, at least one motor mounted adjacent to the turning axes of said forked arms, and toothed gears for transmitting the torque of said motors to the running wheels.

2. Running gear for high-speed suspension cars comprising, in combination with the running wheels, horizontal forked arms hinged to the car body, each of said forked arms carrying one of said wheels, at least one motor mounted on said forked arms and adjacent the axes thereof, and toothed gears for transmitting the torque of said motors to the running wheels.

3. In a high speed suspension car, the combination with a car frame, of arms, means pivotally connecting said arms to said frame, spring means connecting the free end of each arm with said frame, running wheels carried by said arms, a driving motor mounted on one of said arms adjacent the pivot, and geared means for transmitting the torque of said motor to said running wheels.

4. The invention as set forth in claim 3 wherein said arms are bifurcate and the running wheels are mounted between the branches thereof and wherein said motor is mounted on one of said branches.

5. The invention as set forth in claim 3 wherein said arms are bifurcate and a portion of said geared means is disposed between the arms thereof.

6. The invention as set forth in claim 3 wherein said motor is disposed substantially within the profile established by the principal members of the vehicle.

In testimony whereof I have affixed my signature.

CURT STEDEFELD.